United States Patent [19]

Parsons et al.

[11] 4,378,676
[45] Apr. 5, 1983

[54] BOOSTER FOR A HYDRAULIC CLUTCH SYSTEM

[75] Inventors: David Parsons, Kenilworth; David R. Arrowsmith, Leamington Spa, both of England

[73] Assignee: Automotive Products Limited, Leamington Spa, England

[21] Appl. No.: 159,378

[22] Filed: Jun. 13, 1980

[30] Foreign Application Priority Data

Jun. 15, 1979 [GB] United Kingdom ................ 7920909

[51] Int. Cl.³ ............................................. B60T 13/12
[52] U.S. Cl. ........................................ 60/548; 60/554; 60/555; 60/560
[58] Field of Search ................ 60/548, 554, 555, 560; 91/460, 416, 417 R, 369 A

[56] References Cited

U.S. PATENT DOCUMENTS

| 2,844,941 | 7/1958 | Ayers, Jr. | 60/548 |
| 3,126,987 | 3/1964 | Stell | 91/416 |
| 3,152,449 | 10/1964 | Schultz | 60/554 |
| 3,733,966 | 5/1973 | Brown, Jr. | 91/417 R |
| 3,921,502 | 11/1975 | Lauer | 91/460 |
| 4,199,947 | 4/1980 | Mathues | 60/548 |
| 4,248,135 | 2/1981 | Peeples | 91/460 |
| 4,274,326 | 6/1981 | Peeples | 91/369 A |

FOREIGN PATENT DOCUMENTS 1192949 5/1970 United Kingdom .
1248914 10/1971 United Kingdom .
1390560 4/1975 United Kingdom .

Primary Examiner—Abraham Hershkovitz
Attorney, Agent, or Firm—Kemon & Estabrook

[57] ABSTRACT

An air/hydraulic servomotor unit for providing power assistance for a clutch hydraulic operating system and comprising a compressed air cylinder, a hydraulic slave cylinder, a load proportioning means that determines what ratio of the unit output is derived from the hydraulic and air cylinders, and a clutch operating member.

The hydraulic slave cylinder is secured to one end of the air cylinder housing and has a piston which passes through the air cylinder piston so that both pistons can act against the proportioning means. All the unit output loads pass through the proportioning means prior to being transmitted to the operating member.

2 Claims, 1 Drawing Figure

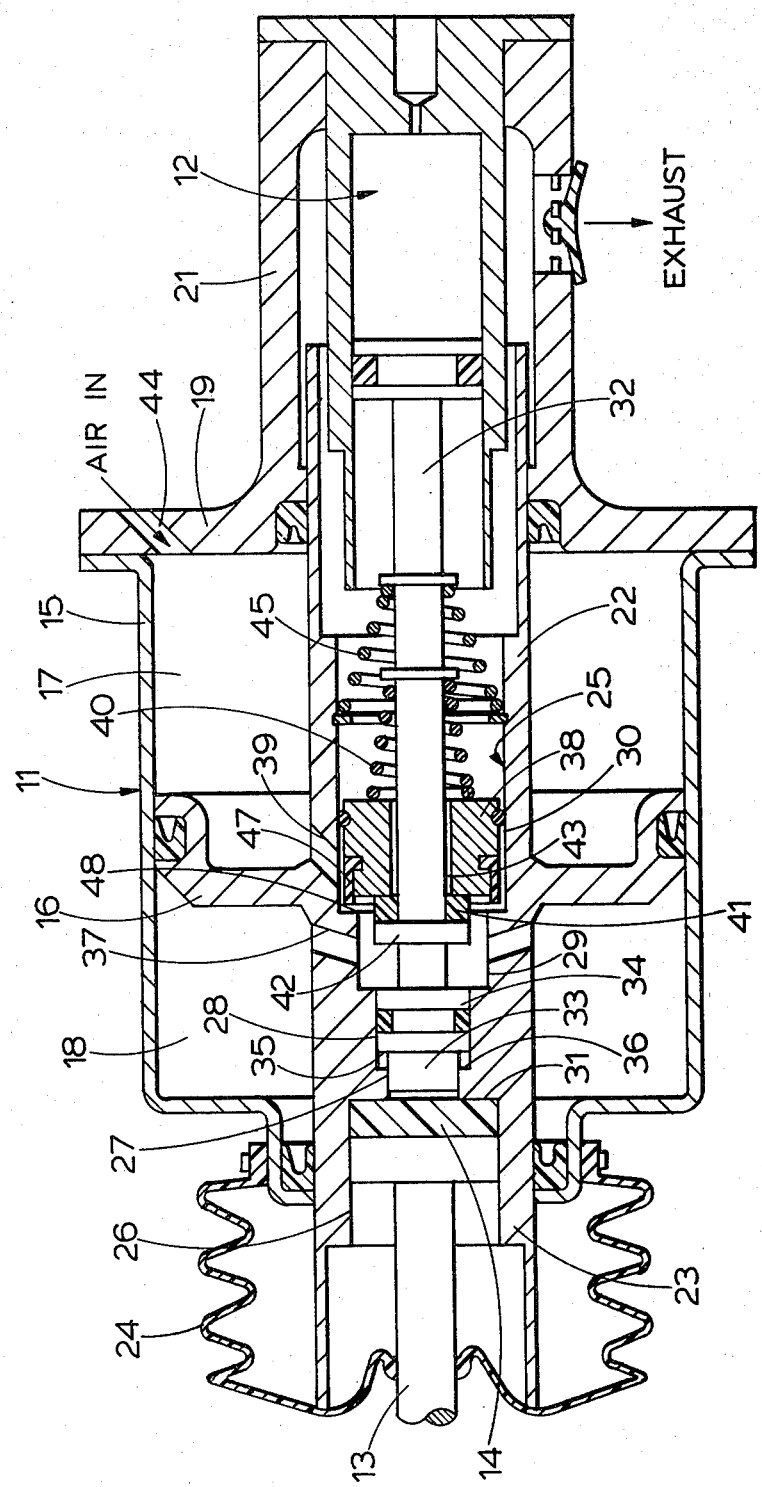

BOOSTER FOR A HYDRAULIC CLUTCH SYSTEM

This invention relates to air/hydraulic servomotor units that provide power assistance for hydraulic actuation systems for clutches, particularly but not exclusively for motor vehicle clutches.

Typical clutch servomotors are illustrated in British Pat. Nos. 1,192,949 and 1,248,914. Such devices operate to release the clutch driven plate so as to disengage the clutch, and operate against the load in the clutch springs. Whilst it is necessary to generate sufficient servomotor load to overcome the load in the clutch springs, the servomotors must have sufficient stroke to completely release the driven plate.

The provision of the necessary servomotor stroke tends to make clutch release servomotors bulky items, which it is sometimes difficult to accommodate on the vehicle.

The servomotor shown in British Pat. No. 1,192,949 is a direct acting servomotor that must be fitted in line with the driver operated clutch pedal. The servomotor shown in British Pat. No. 1,248,914, whilst being a remote servomotor is not sufficiently sensitive to feed back from the clutch and therefore the drivers clutch control may not be as smooth as is desired. This is because there is not direct connection between the servomotor load proportioning means, which is an air/hydraulic balance valve, and the servomotor output rod.

The present invention provides a clutch servomotor arrangement which obviates the disadvantages of the prior art and also provides for a compact arrangement of the servomotor.

Accordingly there is provided an air/hydraulic servomotor unit for providing power assistance for a clutch hydraulic system and comprising a compressed air cylinder, housing a servo piston responsive to a pressure differential to provide the assistance, a hydraulic slave cylinder co-axial with the servo piston and fixed to one end of the air cylinder, a co-axial clutch operating member at the other end of the air cylinder, and a load proportioning means for determining the ratio in which the unit output is derived from the hydraulic slave cylinder and the air cylinder, the slave cylinder having a piston with a co-axial extension that passes through the servo piston so that both pistons engage with the proportioning means through which all output loads are transmitted to the clutch operating member.

The term servo piston is also meant to include similar devices such as diaphragms.

The invention will be described by way of example and with reference to the accompanying drawing which is a schematic section through an air/hydraulic servo unit according to this invention.

Referring to the drawing the air/hydraulic servomotor comprises a compressed air cylinder 11, a co-axial hydraulic slave cylinder 12, a clutch operating rod 13 for transmitting the servomotor output load to a vehicle clutch release mechanism (not shown), and a load proportioning means 14 for determining the proportion in which the output load is derived from the air and hydraulic cylinders.

The compressed air cylinder 11 has a cylindrical housing 15 with a servo piston 16 that divides the housing into two chambers, an inlet chamber 17 and an exhaust chamber 18. The end wall 19 of the inlet chamber 17 has a co-axial tubular extension 21 projecting away from the housing. The slave cylinder 12 is located in the tubular extension 21.

The servo piston 16 has two oppositely extending co-axial tubular projections 22 and 23 each of which passes through and is sealed against an end wall of the housing 15. The first tubular projection 22 extends towards the slave cylinder 12 and surrounds a portion thereof, there being sufficient clearance between slave cylinder 12 and the extension 21 of the housing 15 to allow the projection 22 to telescope relative to the slave cylinder. The second tubular projection 23 extends towards the co-axial clutch operating rod 13 and is co-extensive with a portion thereof. The rod 13 and second projection 23 are surrounded by an elastomeric annular boot 24 fitted at one end to the rod 13 and at the other end to the housing 15. The boot 24 prevents the ingress of dirt into the servomotor.

The servo piston 16 has a co-axial stepped through bore 25 having five different diameter portions, which are numbered from left to right 26, 27, 28, 29 and 30 respectively. The first diameter portion 26 receives the head of the output rod 13 and the proportioning means 14, which is an elastomeric disc, is trapped between the head of the rod 13 and a shoulder 31 between the first and the second diameter portions 26 and 27 respectively. The second portion 27 has the smallest diameter, and the different diameters of the stepped bore 25 thereafter increase progressively from left to right.

The smallest diameter portion 27 receives the head 33 of the slave cylinder piston 32, which is supported for its sliding movement by an adjacent larger diameter portion 34 of the head 33 which is a slide fit in the third diameter portion 28 of the bore 25. The shoulder 35 on the head 33 between the two portions 33 and 34 limits the relative movement of the piston 32 towards the output rod 13 by abutment against the shoulder 36 between the second and third diameter portions 27 and 28 respectively, and provides for direct load transfer from the piston 32 to the servo piston 16.

The fourth diameter portion 29 provides an annular chamber around the piston 32 which is connected to the exhaust chamber by passageways 37.

The fifth diameter portion 30 houses a co-axial annular valve member 38 which is sealingly slidable therein. The valve member 38 is biassed towards the output rod 13 by a spring 40 acting between the piston 32 and the valve member. The valve member 38 abuts a seal 41 supported by a collar 42 on the piston 32 so as to seal an air passageway 43 through the centre of the valve member 38. An air passageway 39 connects the portion 30 with the inlet chamber 17 and the valve member 38 carries a seal 47 that can abut the shoulder 48 between the fourth and fifth diameter portions, 29 and 30 respectively, to cut off air flow between said portions 29 and 30.

A return spring 45 acts between the internal wall of the projection 22 and the piston 32 to return the piston towards the slave cylinder 12.

The servomotor is of the suspended air pressure type in which air pressure is introduced through an inlet 44 in the end wall 19 into the inlet chamber 17, and via passageway 39, bore portions 30 and 29, passageways 37 into the exhaust chamber 18.

From a starting position as shown in the drawings, with air pressure on both sides of the servo piston 16 the servo operation is as follows:

1. Hydraulic pressure is created in the slave cylinder 12 by the vehicle driver operating the clutch master cylinder. This causes the piston 32 to move towards the output rod 13.

2. The seal 47 sits upon the shoulder 48 thereby cutting off the air pressure to the exhaust chamber 18.

3. A further increase in hydraulic pressure causes the piston 32 to move even further towards the output rod 13, and loads the disc 14. The valve member 38 is held on the shoulder 48 and the piston 32 and seal 41 move leftwards and thus the passageway 43 is opened and therefore the exhaust chamber 18 is opened to atmosphere via passageway 37, bore portion 29, and passageway 43.

4. The pressure differential thereby created across the servo piston causes the piston 16 to load the output rod 13 via the rubber disc 14, and the piston 16 and slave piston 32 now move leftwards to disengage the clutch. The leftwards movement of the piston 16 continues until the shoulder 42 has moved sufficient to allow the valve 38 to reseat on the seal 41.

The subsequent load applied to the output rod 13 is a summation of the load from the piston 16, and the load from the hydraulic slave cylinder 12.

The required load applied to the clutch release mechanism reacts back into the servo via the output rod 13 and elastomeric disc 14. The output rod 13 is in equilibrium with the servo piston 16 and the piston 32 and the disc 14 reacts in a fluid like manner to distribute the load between the piston 16 and piston 32 in proportion to their respective areas of contact with the disc 14.

Should the equilibrium of the system be upset by the application of a greater hydraulic load to the piston 32, it will move towards the output rod 13 relative to the servo piston 16. This relative movement will cause the seal 41 to lift away from the valve member 38 and allow more air to escape the exhaust chamber 18 thereby increasing the pressure differential across the servo piston 16, so increasing the load applied by the air cylinder to the output rod 13. This will continue until the load applied by the servo piston 16 balances with the other load on the respective area of contact with the disc 14, and the servo piston will have moved further leftwards to close the seal 41 on the valve 38.

Similarly should be equilibrium be upset by lightening the hydraulic load applied to the piston 32, then the piston 32 and valve member 38 are moved away from the output rod until the seal 47 moves away from the shoulder 48 allow air to flow into the chamber 18. This reduces the pressure differential and the servo piston 16 moves rightwards to restore the load balance on the disc 14 until the seal 47 reseats and the balance restored.

When the driver's clutch pedal is fully released, the clutch and the return spring 40 act to move the rod 13 towards the slave cylinder 12 to open the air passageways 37 and 39 so that the same air pressure exists on both sides of the servo piston 16.

We claim:

1. An air/hydraulic servomotor unit for providing power assistance for a clutch operating hydraulic system and comprising:

a compressed air cylinder having a housing with end walls;

said air cylinder housing having a co-axial tubular extension at one end;

a servo piston located in the housing and responsive to a pressure differential to provide said assistance, said piston having co-axial tubular projections extending one on each side of the piston and sealingly passing through their respective air cylinder housing end walls;

a hydraulic slave cylinder co-extensively fitted in said tubular extension and being arranged co-axially with said servo piston and being the means whereby an input load is transmitted to the servo motor unit;

a co-axial clutch operating means at the other end of the housing and located in one of the tubular projections;

a load proportioning means also located in said one tubular projection and which determines the ratio in which the servo motor unit output is derived from the hydraulic slave cylinder and the air cylinder;

a control valve for controlling the pressure differential across the servo piston and which is located in the other tubular projection;

a slave cylinder piston operated by the hydraulic slave cylinder and which has a co-axial extension that passes through the control valve and servo piston so that both pistons engage with the load proportioning means through which all output loads are transmitted to the clutch operating means; and said slave cylinder and co-axial tubular extension having sufficient annular space therebetween so that the tubular projection which houses the control valve can telescope into said annular space.

2. A unit as claimed in claim 1, wherein the proportioning means is an elastomeric disc reactable in a fluid like manner against areas on the servo piston and slave cylinder piston to proportion the output load therebetween.

* * * * *